(12) United States Patent
Iyer et al.

(10) Patent No.: US 7,437,474 B2
(45) Date of Patent: Oct. 14, 2008

(54) PROXY-LESS PACKET ROUTING BETWEEN PRIVATE AND PUBLIC ADDRESS REALMS

(75) Inventors: Prakash N. Iyer, Beaverton, OR (US); Ulhas S. Warrier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 09/792,880

(22) Filed: Feb. 22, 2001

(65) Prior Publication Data

US 2002/0116502 A1 Aug. 22, 2002

(51) Int. Cl.
*G06F 15/173* (2006.01)
(52) U.S. Cl. ................. 709/238; 709/227; 709/245
(58) Field of Classification Search ......... 709/227–234, 709/238, 244
See application file for complete search history.

(56) References Cited

U.S. PATENT DOCUMENTS

| 6,029,203 | A  | * | 2/2000  | Bhatia et al. ........... 709/244 |
| 6,047,325 | A  | * | 4/2000  | Jain et al. ............. 709/227 |
| 6,119,171 | A  | * | 9/2000  | Alkhatib ............... 709/238 |
| 6,304,908 | B1 | * | 10/2001 | Kalajan ................ 709/229 |
| 6,523,068 | B1 | * | 2/2003  | Beser et al. ........... 709/238 |
| 6,708,219 | B1 | * | 3/2004  | Borella et al. ......... 709/245 |
| 6,717,949 | B1 | * | 4/2004  | Boden et al. ........... 370/401 |
| 6,768,743 | B1 | * | 7/2004  | Borella et al. ......... 370/401 |
| 6,798,782 | B1 | * | 9/2004  | Caronni et al. ......... 370/409 |
| 6,879,593 | B1 | * | 4/2005  | Kunze et al. ........... 370/401 |
| 6,944,167 | B1 | * | 9/2005  | McPherson ............. 370/401 |
| 6,996,621 | B1 | * | 2/2006  | Borella et al. ......... 709/228 |
| 7,120,701 | B2 | * | 10/2006 | Warrier et al. ......... 709/245 |
| 7,131,141 | B1 | * | 10/2006 | Blewett et al. ......... 709/229 |

OTHER PUBLICATIONS

Egevang and Francis, "The IP Network Address Translator (NAT)", RFC 1631, The IETF at www.ietf.org, May 1994.*
Srisuresh and Holdrege, "IP Network Address Translator (NAT) Terminology and Considerations", RFC 2663, The IETF at www.ietf.org, Aug. 1999.*
Borella, Michael; Lo, Jeffrey; Grabelsky, David; and Montenegro, Gabriel, "Realm Specific IP: Framework," IETF Internet Draft, Oct. 1999, 25 pages, linked at www.watersprings.org/pub/id/draft-ietf-nat-rsip-framework-02.txt.*
Borella, Michael; Lo, Jeffrey; Grabelsky, David; and Montenegro, Gabriel, "Realm Specific IP: Framework, (draft 5)," IETF Internet Draft, Jul. 2000, 31 pages, linked at www.watersprings.org/pub/id/draft-ietf-nat-rsip-framework-05.txt.*
Nikander, Pekka "Combining Trust Management, Jini, IPv6, and Wireless links: A Proposal for a Service Network Architecture for Ad Hoc Environments Extended Abstract", Helsinki University of Technology, pekka.nikander@hut.fi.
Borella, M., et al., "Realm Specific IP: Framework", Internet Article <URL:http://www.alternic.org/drafts/drafts-I-j/draft-ietf-nat-rsip-framework-05.txt>, XP002234702, pp. 1-31, Jul. 2000.
Zaccone, C., et al., "Address reuse in the Internet, adjourning or suspending the adoption of IP next generation?", *Proceedings of IEEE*, XP010514142, pp. 462-468, Sep. 2000.

* cited by examiner

*Primary Examiner*—Bunjob Jaroenchonwanit
*Assistant Examiner*—Dohm Chankong
(74) *Attorney, Agent, or Firm*—Fish & Richardson P.C.

(57) ABSTRACT

Routing packets of information without proxies over a network having both private and public networks includes reviewing the destination address of a packet received a private network interface and rerouting the packet to a private client connected to the private network interface when the destination address of the packet is the public address of the private network.

29 Claims, 5 Drawing Sheets

PROXY-LESS PACKET ROUTING BETWEEN PRIVATE AND PUBLIC ADDRESS REALMS

BACKGROUND

This invention relates to routing packets, and more particularly to proxy-less packet routing between private and public address realms.

Routing packets involves transferring packets (i.e. pieces of information) between computers in a computer network. A packet includes a data field and an address field. The address field specifies a destination address for which that packet is intended. The address field also specifies a source address from which the packet originated.

Computer networks include computers having a private address and/or a public address. Computers having a private address are in a private network and considered part of a private address realm. Typically, a Request for Comment 1918 ("RFC 1918") standard defines reserved private IP address spaces in the private realm. Computers having a public address are in the public network and considered part of the public address realm.

Computers in a private network are able to route packets to other computers within that private network using the private address realm. Computers in the public network are able to route packets to other computers within the public network using the public address realm. Computers in private and public networks are only able to transfer packets between each other through a gateway between the networks.

Network Address Translation ("NAT") is a protocol that enables Internet Protocol ("IP") computers in a private address realm to transfer packets with IP computers in the public address realm.

DESCRIPTION OF THE DRAWINGS

Like reference symbols in the various drawings indicate like elements.

DETAILED DESCRIPTION

Figure 1:
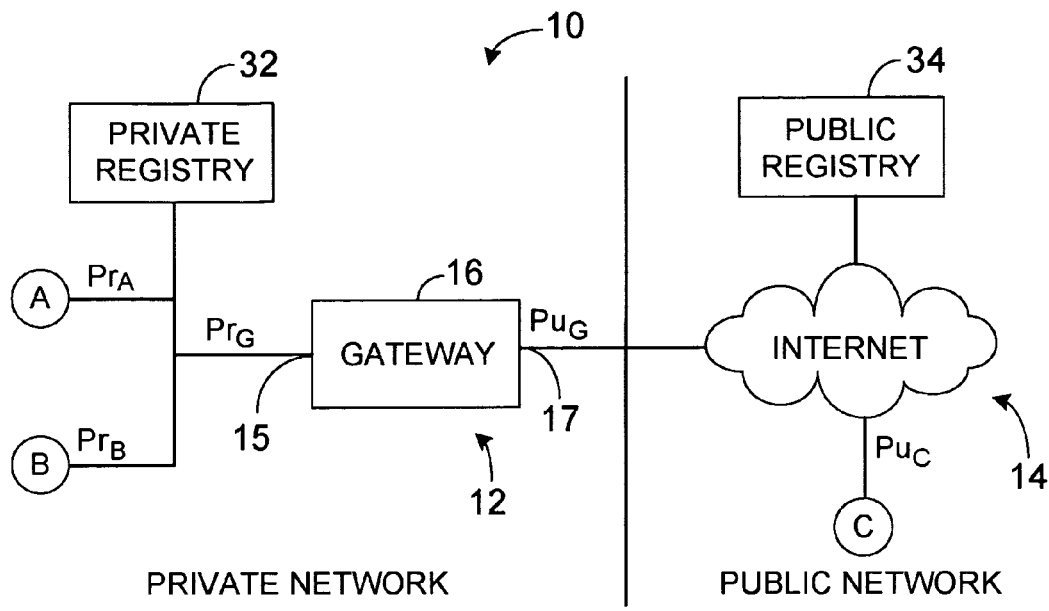
FIG. 1 is a view of a private network and public network.

Network 10 (FIG. 1) includes private network 12 and public network 14. Private network 12 is considered a private address realm. Public network 14 is considered a public address realm.

Private network 12 includes private clients, here computers A and B, and gateway 16. Public network 14 includes public clients, here computer C and also gateway 16.

Private clients A and B share a private addressing scheme known only to members of private network 12 (i.e. the private addressing realm). Each private client has its own private IP address. Here, private client A has the private IP address of $Pr_A$ and private client B has the private IP address of $Pr_B$.

Here, private network 12 also includes a private registry 32. Private clients (e.g. A or B) register an IP addresses in private registry 32 so that applications running on other clients may locate the registered private client.

Public client C has a public addressing scheme known to all members of network 10 (i.e. the public addressing realm). Each public client has its own public IP address. Here, public client C has a public IP address of $Pu_C$.

Here, public network 12 also includes a public registry 34. Public clients (e.g. C) register an IP addresses in public registry 34 so that applications running on other clients may locate the registered public client.

Gateway 16 has a private network interface 15 and a public network interface 17. Private network interface 15 has at least one private address, $Pr_G$, and public network interface 17 has at least one public address $Pu_G$. Here, gateway 16 also has a processor 62 (FIG. 6) for executing various instructions and tasks such as routing packets.

Figure 2:
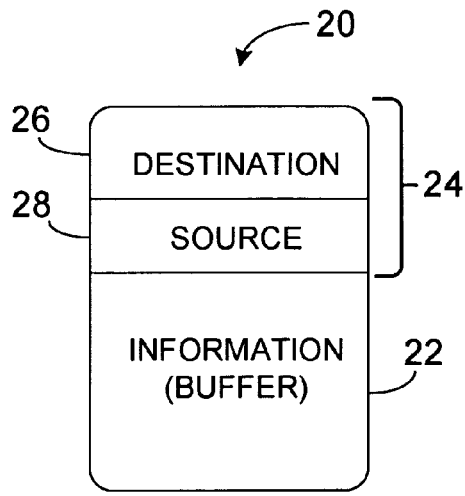
FIG. 2 is a view of a packet.

Packet 20 (FIG. 2) includes information 22 intended for a particular client, for example private client B, and address field 24. Address field 24 includes destination address 26. Destination address 26, which is $Pr_B$ in the present example, directs packet 20 to intended client B. Here, address field 24 also includes a source address 28, for example $Pr_A$, to identify the originator of packet 20, here private client A.

Network Address Translation protocol ("NAT") is a protocol that allows private clients A and B to transfer (i.e. route) packets with public client C. NAT accomplishes this by modifying (i.e. translating) the source IP address and/or ports of outbound packets transmitted from a private network to the public network. NAT maintains these modifications in a manner (e.g. a table) which enables the gateway to de-multiplex address information from inbound packets from the public network received in response to the outbound packets so that it may route the inbound packets to the appropriate private address. Heretofore, NAT required proxies (i.e. application specific software) or application level gateways (ALG) for those applications that embed IP addresses in application packets. ALG modify IP addresses and/or port in such embedded application payloads to comply with NAT requirements.

Realm Specific Internet Protocol ("RSIP") is a protocol that enables clients in the private address realm to perform Host-NAT. Host-NAT implies that each private client (e.g. A) of private network 12 requests and obtains a public IP address from gateway 16, here $Pu_G$, to use instead of its own private IP address (e.g. $Pr_A$) for all applications. Here, functions of NAT and RSIP are combined in processes 30 and 40, described below, to help complete address determination issues in an application-independent (i.e. proxy-less) manner.

Figure 3:
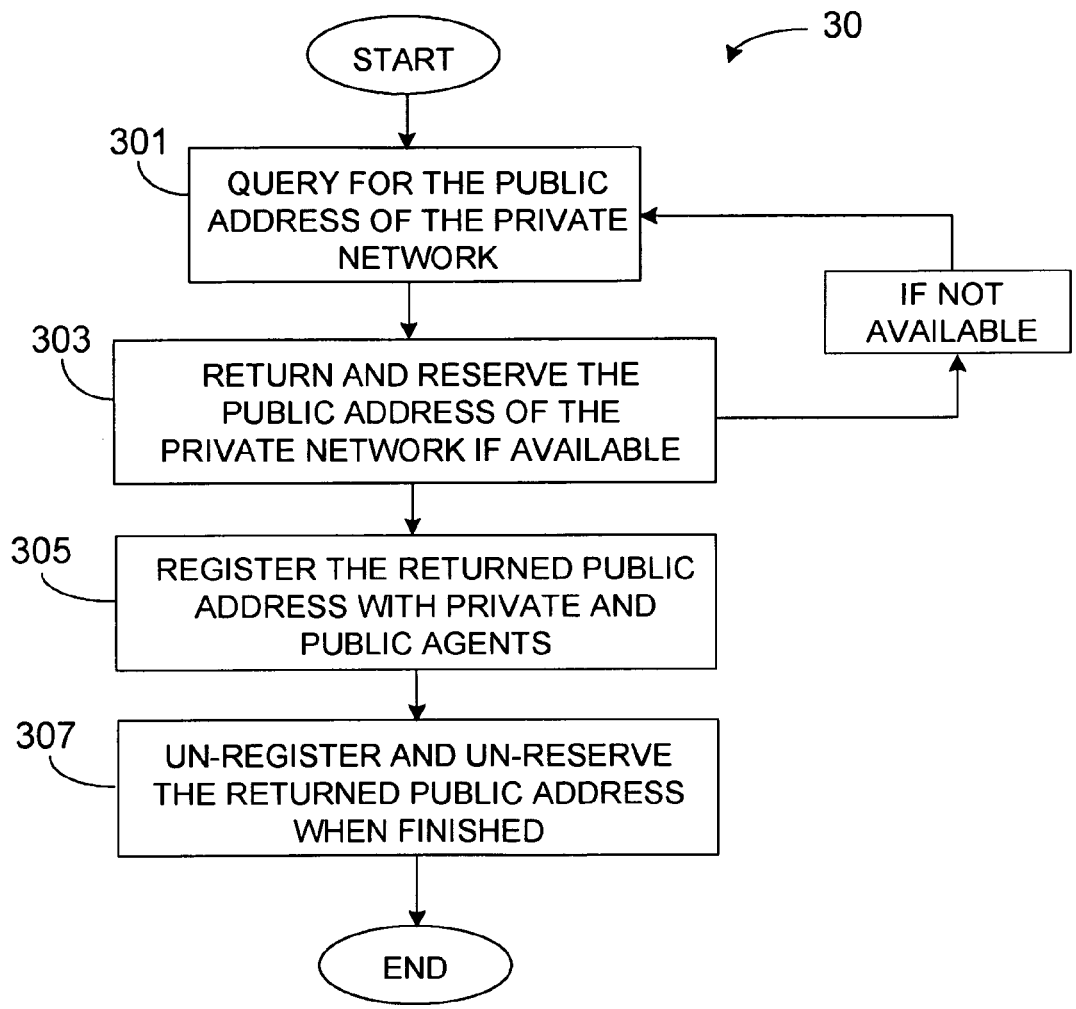
FIG. 3 is a flow diagram of a process for addressing packets.

FIG. 3 shows process 30 for implementing private to public addressing in an application independent (i.e. proxy-less) manner. Process 30 runs for example on private client A and queries (301) gateway 16 to obtain the public address, for example PuG, of private network 12. In response to query (301), a network 12 protocol stack, for example stack 65 (FIG. 6) on gateway 16, returns (303) the public IP address $Pu_G$ of private network 12 and reserves $Pu_G$, in for example RSIP mapping table 67 (FIG. 6), for use by an application X running on A. After receipt of network public IP address $Pu_G$, process 30 registers (305) $Pu_G$ with private and public agents such as private registry 32 and public registry 34 (FIG. 1) as the source (i.e. return) address for private client A. Finally, process 30 un-registers (307) $Pu_G$ with private and public agents, such a registries 32 and 34, and un-reserves $Pu_G$ once application X running on private client A is finished.

Figure 4:
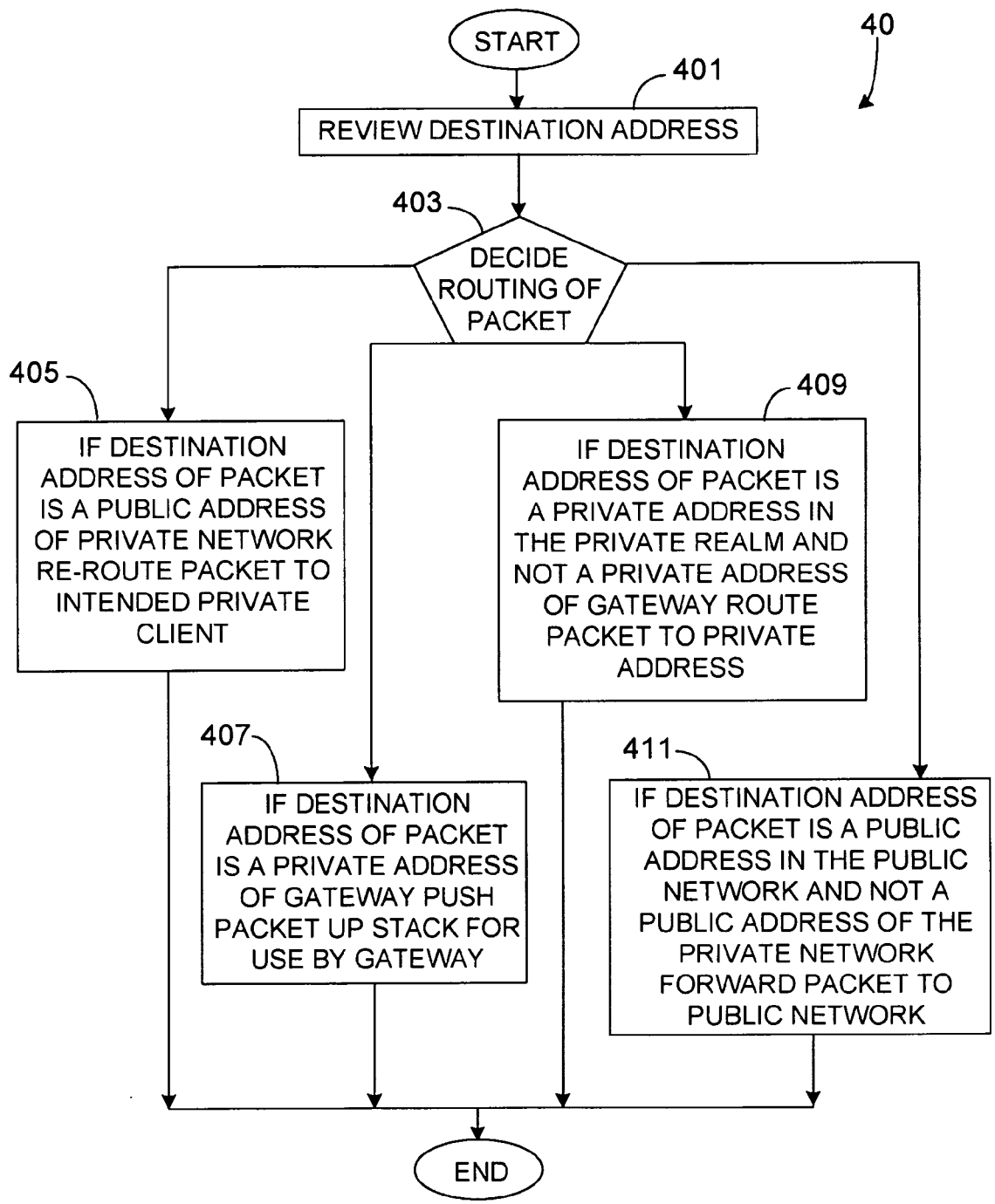
FIG. 4 is a flow diagram of a process for routing packets.

FIG. 4 shows process 40 for routing packets 20 without proxies. Process 40, here implemented by processor 62, reviews (401) destination address 26 of inbound packet 20 received at private network interface 15 of gateway 16. Process 40 determines (403) how to route inbound packet 20 based on that review (401).

If destination address 26 of packet 20 is public address $Pu_G$ of gateway 16 process 40 reroutes (405) packet 20 to the private client that reserved $Pu_G$ in process 30. Here, a RSIP mapping table 67 created in process 30 is consulted to determine which private client reserved public address $Pu_G$. If public address $Pu_G$ has not been reserved (e.g. if a mapping is not found) then packet 20 is dropped.

If destination address 26 of packet 20 is the private address $Pr_G$ of gateway 16, then process 40 pushes (407) packet 20 up stack 65 to be used by gateway 16. If destination address 26 of packet 20 is a private address in the private address realm and not the private address $Pr_G$ of gateway 16, then the packet 20 is routed (409) to the private client specified by the private address. If destination address 26 of packet 20 is a public address in the public address realm and not $Pu_G$ forward (411) packet 20 on interface 17 of gateway 16 to public network 14. Additional packet processing (not relevant in this context) may occur before packet 20 is forwarded.

Figure 5:
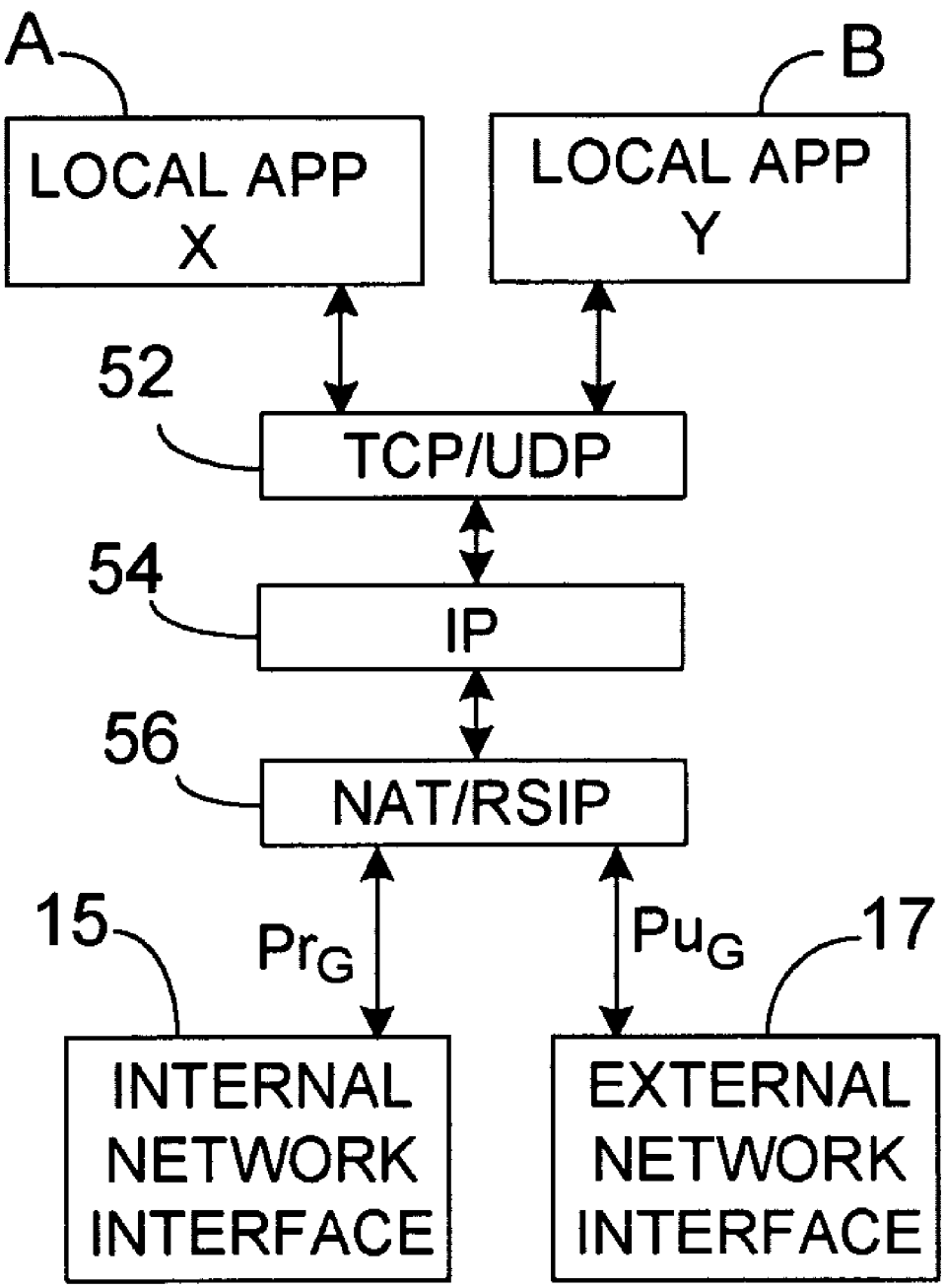
FIG. 5 is a view of the IP layer in a private network for implementing processes of FIG. 3 and FIG. 4.

FIG. 5 shows an example of protocol layers for implementing process 30 and 40. Local applications X and Y here run on private clients A and B respectfully. To send a packet 20 (i.e. process 30) application X obtains a private IP address, here $Pr_A$ for client A, at IP layer 54. The IP layer 54 negotiates with NAT/RSIP layer 56 to secure a public address of private network 12 from internal network interface 15. NAT/RSIP layer 56 returns secured public address, for example PuG, to IP layer 54 for use as a source address 28, (provided the particular address field 24 of packet 20 has a source address 28) and/or to be stored in registries 32 and 34 and NAT/RSIP mapping table 67. NAT/RSIP layer 56 may also modify the source port obtained in TCP/UDP layer 52 according to NAT/RSIP protocol before packet 20 may be routed by gateway 16 to its destination address. The modification of the source port will also be stored in NAT/RSIP mapping table 67.

Similarly, to receive a packet 20 (i.e. process 40) at internal or external interface 15 or 17 addressed to the public address of private network 12 (i.e. 405), for example $Pu_G$, NAT/RSIP layer 56 is used to obtain the private address, for example $Pr_B$, which reserved public address $Pu_G$. Once private address $Pr_B$ is obtained, packet 20 may be routed to its intended destination client, here application Y running on private client B.

Figure 6:
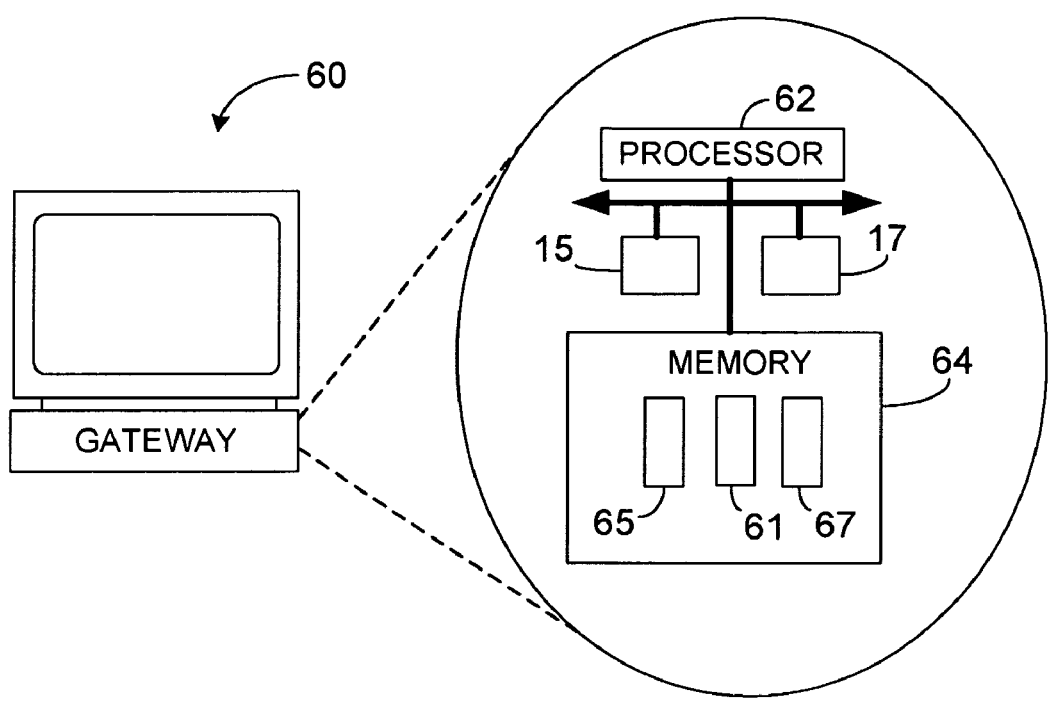
FIG. 6 is a view of computer hardware used to implement one embodiment of the invention.

FIG. 6 shows a computer 60 serving as a gateway 16 for routing packets 20 according to processes 30 and 40. Computer 60 includes a processor 62, a memory 64 including executable instructions 61, a protocol stack 65 and a mapping table 67, and private and public network interfaces 15 and 17. Processor 62 executes computer instruction of RAM (not shown) to implement processes 30 and 40.

Processes 30 and 40, however, are not limited to use with any particular hardware or software configuration; they may find applicability in any computing or processing environment. Processes 30 and 40 may be implemented in hardware, software, or a combination of the two. Processes 30 and 40 may be implemented in computer programs executing on programmable computers that each include a processor, a storage medium readable by the processor (including volatile and non-volatile memory and/or storage elements and input and output devices.

Each such program may be implemented in a high level procedural or object-oriented programming language to communicate with a computer system. However, the programs can be implemented in assembly or machine language. The language may be a compiled or interpreted language.

Each computer program may be stored on a storage medium or device (e.g. CD-ROM, hard disk, or magnetic diskette) that is readable by a general or special purpose programmable computer for configuring and operating the computer when the storage medium or device is read by the computer to perform processes 30 and 40. Processes 30 and 40 may also be implemented as a computer-readable storage medium, configured with a computer program, where, upon execution, instruction in the computer program cause the computer to operate in accordance with processes 30 and 40.

A number of embodiments of the invention have been described. Nevertheless, it will be understood that various modifications may be made without departing from the spirit and scope of the invention. For example, gateway 16 may have multiple public and private addresses for routing packets between private and public networks. Moreover, processor 62, stack 65 and table 67 need not be located on gateway itself, but may be positioned else where in the network. Accordingly, other embodiments not explicitly described herein are also within the scope of the following claims.

What is claimed is:

1. A network gateway, comprising:
a public network interface having at least one public address;
a private network interface having at least one private address;
a network protocol stack to provide one of the public addresses of the network gateway in response to a request to the gateway for a network address by each of one or more applications executing on private clients connected to the private network interface; and
a processor that reviews a destination address of a first packet received at the private network interface, the first packet being sent from a first private client connected to the private network interface, and routes the first packet to a second private client connected to the private network interface when the destination address of the first packet corresponds to a first public address of the gateway that the network protocol stack provided to one of the applications executing on the second private client, in which the first and second private clients share a private addressing scheme,
wherein the processor also reviews a destination address of a second packet received at the private network interface, the second packet being sent from the second private client, and routes the second packet to the first private client when the destination address of the second packet corresponds to a second public address of the gateway that the network protocol stack provided to one of the applications executing on the first private client.

2. The gateway of claim 1, wherein the processor routes the first packet based on a private address of the second private client reserved in a mapping table.

3. The gateway of claim 1, further comprising a memory that stores a mapping table for routing the first packet.

4. The gateway of claim 3, wherein the processor searches for the private address of the second private client in the mapping table.

5. The gateway of claim 4, wherein the processor executes instructions to drop the first packet when the private address of the second private client is not found in the mapping table.

6. The gateway of claim 1, wherein the processor routes the first packet without routing the first packet to a public network.

7. The gateway of claim 1, further comprising:
a memory that stores the network protocol stack;
wherein the processor routes the first packet up the network protocol stack when the destination address of the first packet is the private address of the gateway.

8. The gateway of claim 1, wherein the processor executes instructions to route the first packet to a public network connected to the public network interface when the destination address of the first packet is not the public address of the gateway, the private address of the gateway, or a private address of a private client connected to the private network interface.

9. A method, performed by a network gateway, comprising:
reviewing a destination address of a first packet received at a private network interface of the gateway, the first packet being sent from a first private client connected to the private network interface;
routing the first packet to a second private client connected to the private network interface of the gateway when the destination address of the first packet corresponds to a first public address of the gateway that the gateway provided to an application executing on the second private client for use by the application as a source address, in which the first and second private clients share a private addressing scheme;
reviewing a destination address of a second packet received at the private network interface of the gateway, the second packet being sent from the second private client; and
routing the second packet to the first private client when the destination address of the second packet corresponds to a second public address of the gateway that the gateway provided to an application executing on the first private client for use by the application as a source address.

10. The method of claim 9, wherein the gateway routes the first packet based on a private address of the second private client reserved in a mapping table.

11. The method of claim 10, further comprising searching for the private address of the second private client in the mapping table.

12. The method of claim 11, further comprising causing the gateway to drop the first packet when the private address of the second private client is not found in the mapping table.

13. The method of claim 9, wherein routing occurs without routing the first packet to a public network.

14. The method of claim 9, wherein the gateway routes the first packet up a protocol stack when the destination address of the first packet is a private address of the gateway.

15. The method of claim 9, wherein the gateway routes the first packet to a public network connected to a public network interface of the gateway when the destination address of the first packet is not the public address of the gateway, the private address of the gateway, or a private address of a private client connected to the private network interface of the gateway.

16. An article comprising:
a machine-readable medium that stores instructions for causing a machine to:
review a destination address of a first packet received at a private network interface of the gateway, the first packet being sent from a first private client connected to the private network interface;
route the first packet to a second private client connected to the private network interface of the gateway when the destination address of the first packet corresponds to a first public address of the gateway that the gateway provided to an application executing on the second private client for use by the application as a source address, in which the first and second private clients share a private addressing scheme;
review a destination address of a second packet received at the private network interface of the gateway, the second packet being sent from the second private client; and
route the second packet to the first private client when the destination address of the second packet corresponds to a second public address of the gateway that the gateway provided to an application executing on the first private client for use by the application as a source address.

17. The article of claim 16, further comprising instructions for causing the machine to route the first packet based on a private address of the second private client reserved in a mapping table.

18. The article of claim 17, further comprising instructions for causing the machine to search for the private address of the private client in the mapping table.

19. The article of claim 18, further comprising instructions for causing the machine to drop the first packet when the private address of the second private client is not found in the mapping table.

20. The article of claim 16, further comprising instructions for causing the machine to route the first packet without routing the packet to a public network.

21. The article of claim 16, further comprising instructions for causing the machine to route the first packet through a protocol stack when the destination address of the packet is a private address of the gateway.

22. The article of claim 16, further comprising instructions for causing the gateway to route the first packet to a public network connected to a public network interface of the gateway when the destination address of the first packet is not the public address of the gateway, the private address of the gateway, or a private address of a private client connected to the private network interface of the gateway.

23. A system over which packets are transported, comprising:
a private network having at least one private address;
a public network having at least one public address;
a gateway between the private and public networks; and
a protocol stack to provide one of the public addresses of the network gateway in response to a query to the gateway for a network address by each of one or more applications executing on private clients connected to the private network;
wherein the system reviews a destination address of a first packet received at a private network interface of the gateway, the first packet being sent from a first private client connected to the private network interface, and routes the first packet to a second private client connected to the private network interface when the destination address of the first packet is a first public address of the gateway that the protocol stack provided to one of the applications executing on the second private client, in which the first and second private clients share a private addressing scheme,
wherein the system also reviews a destination address of a second packet received at the private network interface of the gateway, the second packet being sent from the second private client, and routes the second packet to the first private client when the destination address of the second packet is a second public address of the gateway that the protocol stack provided to one of the applications executing on the first private client.

24. The system of claim 23, wherein the system routes the first packet based on a private address of the second private client reserved in a mapping table.

25. The system of claim 23, wherein the system routes the first packet to a public network client when the destination address of the first packet is not the public network interface of the gateway, the private network interface of the gateway, or a private client of the gateway.

26. The gateway of claim 1, wherein the network protocol stack provides one or more public addresses of the network gateway in response to requests to the gateway for network addresses by all applications executing on the first and second private clients.

27. The system of claim 23, further comprising applications executing on the first and second private clients in which each application obtains the public address of the gateway and registers the public address with a private registry of the private network and a public registry of the public network.

28. The system of claim 23 wherein the system implements a Transport Control Protocol (TCP)/User Datagram Protocol (UDP) layer, an Internet Protocol (IP) layer, and a Network Address Translation (NAT)/Realm Specific Internet Protocol (RSIP) layer, in which the IP layer negotiates with the NAT/RSIP layer to obtain the public address of the private network for use by the IP layer as a source address.

29. The system of claim 23 in which the protocol stack provides one or more public addresses of the network gateway in response to queries to the gateway for network addresses by all applications executing on the first and second private clients.

* * * * *